United States Patent [19]

Valko et al.

[11] Patent Number: 5,074,979
[45] Date of Patent: Dec. 24, 1991

[54] CATIONIC RESIN CONTAINING BLOCKED ISOCYANATE GROUPS SUITABLE FOR USE IN ELECTRODEPOSITION

[75] Inventors: Joseph T. Valko, Pittsburgh; Richard F. Karabin, Ruffs Dale, both of Pa.

[73] Assignee: PPG Industries, Inc., Pittsburgh, Pa.

[21] Appl. No.: 540,991

[22] Filed: Jun. 20, 1990

[51] Int. Cl.$^5$ .............................................. C25D 13/00
[52] U.S. Cl. .................................. 204/181.7; 523/415; 528/45; 528/73
[58] Field of Search ..................... 204/181.7; 523/415; 528/45, 73

[56] References Cited

U.S. PATENT DOCUMENTS

| | | | |
|---|---|---|---|
| 3,922,253 | 11/1975 | Jerabek et al. | 260/77.5 TB |
| 3,935,087 | 1/1976 | Jerabek et al. | 204/181 |
| 4,007,154 | 2/1977 | Schimmel et al. | 260/37 EP |
| 4,147,679 | 4/1979 | Scriven et al. | 204/181.7 |
| 4,212,779 | 7/1980 | Schmolzer et al. | 260/22 CQ |
| 4,260,720 | 4/1981 | Bosso et al. | 528/109 |
| 4,452,834 | 6/1984 | Nachtkamp et al. | 427/379 |
| 4,468,307 | 8/1984 | Wismer et al. | 204/181.7 |
| 4,480,008 | 10/1984 | Farronato et al. | 528/45 |
| 4,536,558 | 8/1985 | Kordomenos | 528/100 |
| 4,609,446 | 9/1986 | Geist et al. | 204/181.7 |
| 4,829,105 | 5/1989 | Yamada et al. | 528/45 |
| 5,008,351 | 4/1991 | Paar | 525/528 |

FOREIGN PATENT DOCUMENTS 317185  5/1989  European Pat. Off. .

Primary Examiner—John Niebling
Assistant Examiner—Steven P. Marquis
Attorney, Agent, or Firm—Gary J. Connell; William J. Uhl

[57] ABSTRACT

A cationic resin containing blocked isocyanate groups which is suitable for use in electrodeposition is disclosed. The cationic resin is derived from an epoxy resin and contains in the resin molecule cationic salt groups, active hydrogen groups and blocked isocyanate groups. The blocked isocyanate groups are incorporated into the resin molecule by reacting the epoxy resin with a compound selected from the class consisting of mercapto compounds and acid group-containing compounds where the compounds also contain blocked isocyanate groups. The resin can be formulated into an electrocoating composition which is free of lead and yet provides outstanding corrosion resistance when electrodeposited over steel substrates. The outstanding corrosion resistance can be attained when the substrate has not been given a chrome rinse which is conventional in pretreating the steel substrate before electrodeposition.

30 Claims, No Drawings

CATIONIC RESIN CONTAINING BLOCKED ISOCYANATE GROUPS SUITABLE FOR USE IN ELECTRODEPOSITION

BACKGROUND OF THE INVENTION

1. Field of the Invention

The present invention relates to cationic resins and to their use in electrodeposition, and more particularly, relates to cationic resins containing blocked isocyanate groups and to their use in electrodeposition over steel substrates.

2. Brief Description of the Prior Art

Electrodeposition as a coating application method involves deposition of a film-forming composition under the influence of an applied electrical potential. Electrodeposition has become increasingly important in the coatings industry because by comparison with non-electrophoretic coating means, electrodeposition offers higher paint utilization, outstanding corrosion protection and low environmental contamination. Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

To achieve the best corrosion resistance over steel substrates, the cationic electrodepositable composition is formulated with lead either as a pigment or as a soluble lead salt. However, lead is a very toxic material and as such presents many difficulties to the paint supplier and paint customer. The lead often finds its way into the effluent of the electrodeposition process which necessitates costly treatment processes to remove the lead. Also, to achieve optimum corrosion resistance, the steel substrate is usually pretreated prior to electrodeposition with a phosphate conversion coating and given a chromic acid rinse (chrome rinse) at the conclusion of the pretreatment process. Chromium is also a toxic material and effluent from the pretreatment process containing chromium must be treated and disposed of in a safe and ecological manner. This treatment process can be very costly.

SUMMARY OF THE INVENTION

In accordance with the present invention, a cationic resin, its method of preparation and the use of the resin in the process of cationic electrodeposition is provided. Electrodepositable aqueous dispersions of the cationic resin when electrocoated over steel substrates provide outstanding corrosion resistance even when the dispersions are free of lead and the steel substrate has not been pretreated and given a chrome rinse. The cationic resin is derived from an epoxy resin and contains in the resin molecule cationic salt groups, active hydrogen groups and blocked isocyanate groups. The blocked isocyanate groups are incorporated into the resin molecule by reacting the epoxy resin with a compound selected from the class consisting of mercapto compounds and acid group-containing compounds in which the compounds also contain blocked isocyanate groups. The acid group-containing compounds are preferred.

DETAILED DESCRIPTION

The cationic water-dispersible resin of the present invention can be prepared by mixing together a polyepoxide, a polyhydroxyl group-containing material selected from alcoholic hydroxyl group-containing materials and phenolic hydroxyl group-containing materials and an acid or mercapto group-containing material which also contains blocked isocyanate groups. The mixture is heated to form a resinous reaction product which is further reacted with a cationic salt group former to form the cationic resin.

The invention also provides for a method of cationic electrodeposition using aqueous dispersions of the cationic resin.

The polyhydroxyl group-containing material and the acid or the mercapto group-containing compound which contains a blocked isocyanate group compete with one another for reaction with the epoxy functionality in the polyepoxide. The reaction can be conducted neat or in the presence of an organic solvent such as ketones such as methyl isobutyl ketone and methyl amyl ketone, aromatics such as toluene and xylene and glycol ethers such as the dimethylether of diethylene glycol. Typically, reaction is conducted at a temperature of from 95° to 105° C. for about 60 to 180 minutes until an epoxy group-containing resinous reaction product is obtained. Typically, the reaction product will have an epoxy equivalent based on solids of no greater than 3000, preferably from about 1200 to 2500.

The equivalent ratio of reactants, i.e., epoxy:polyhydroxyl group-containing material:acid or mercapto compound containing blocked isocyanate groups typically is from 1:0.10 to 0.75:0.25 to 0.60.

Examples of polyepoxides are those having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Besides polyhydric phenols, other cyclic polyols can be used in preparing the polyglycidyl ethers of cyclic polyol derivatives. Examples of other cyclic polyols would be alicyclic polyols, particularly cycloaliphatic polyols such as 1,2-cyclohexanediol and 1,2-bis(-hydroxymethyl)cyclohexane. The preferred polyepoxides have molecular weights of at least 200 and preferably within the range of 200 to 2000, and more preferably about 340 to 2000. Epoxy group-containing acrylic polymers can also be used, but their use is not preferred.

Examples of polyhydroxyl group-containing materials to chain extend or advance the molecular weight of the epoxy resin (i.e., through hydroxyl-epoxy reaction) can be selected from alcoholic hydroxyl group-containing materials and phenolic hydroxyl group-containing materials. Examples of alcoholic hydroxyl group-containing materials are simple polyols such as neopentyl glycol as described in Canadian Patent 1,179,443; polyester polyols such as described in U.S. Pat. No. 4,148,772; polyether polyols such as described in U.S. Pat. No. 4,468,307 and urethane diols such as described in U.S. application Ser. No. 07/315,954. Examples of phenolic hydroxyl group-containing materials are polyhydric phenols such as bisphenol A, phloroglucinol and resorcinol. Mixtures of alcoholic and phenolic hydroxyl group-containing materials can be used. A preferred polyhydroxyl group-containing material is a polyether polyol of the type disclosed in U.S. Pat. No. 4,419,467. These polyether polyols are formed from reacting (A) cyclic polyols such as polyhydric phenols such as bisphenol A or resorcinol and cycloaliphatic polyols such as 1,2-cyclohexanediol or 1,4-cyclohexanedimethanol with (B) ethylene oxide or a mixture of ethylene oxide and an alkylene oxide having 3 to 8 carbon atoms in the alkylene group, i.e., propylene oxide, the molar ratio of (B) to (A) being within the range of 3 to 20:1. Preferably, the polyether polyol is used in admixture with a polyhydric phenol such as resorcinol.

As mentioned above, the polyhydroxyl group-containing material is preferably reacted with a polyepoxide simultaneously with the acid or the mercapto functional material containing the blocked isocyanate groups. Alternately, the polyepoxide can be first reacted with the polyhydroxyl group-containing material to chain extend or advance the epoxy resin followed by reaction with the acid or mercapto functional material containing the blocked isocyanate groups.

The acid group or mercapto group-containing compound which also contains the blocked isocyanate groups can be prepared by reacting a hydroxyl group-containing acid material or a hydroxyl group-containing mercapto material with a partially capped polyisocyanate. Preferably, the acid or mercapto-functional compound is monofunctional with regard to the acid or mercapto groups. The isocyanate functionality will react preferentially with the hydroxyl groups leaving the acid or mercapto groups available for subsequent reaction with the epoxy functionality. Reaction is usually conducted in the presence of an inert organic solvent such as ketones such as acetone, methyl ethyl ketone and methyl isobutyl ketone, and glycol ethers such as the dimethylether of diethylene glycol and a catalyst, for example, a tin catalyst such as dibutyltin dilaurate. Reaction is usually conducted until the resultant reaction product is substantially free of isocyanate functionality. Typical reaction temperatures and times are from 40° to 100° C. for about 30 to 400 minutes. Examples of suitable hydroxyl-containing acids are hydroxyl group-containing carboxylic acids such as dimethylolpropionic acid, malic acid and 12-hydroxystearic acid. Examples of hydroxyl group-containing mercapto compounds are 1-thioglycerol, mercaptoethanol and mercaptophenol.

Examples of suitable polyisocyanates are aromatic and aliphatic, including cycloaliphatic polyisocyanates. Representative examples include 2,4- or 2,6-toluene diisocyanate including mixtures thereof and p-phenylene diisocyanate, tetramethylene and hexamethylene diisocyanate and dicyclohexylmethane-4,4'-diisocyanate, isophorone diisocyanate, diphenylmethane-4,4'-diisocyanate and polymethylene polyphenyl isocyanate. Higher polyisocyanates such as triisocyanates can be used and an example would include triphenylmethane-4,4',4''-triisocyanate. NCO-prepolymers such as reaction products of polyisocyanates with polyols such as neopentyl glycol and trimethylolpropane and with polymeric polyols such as polycaprolactone diols and triols (NCO/OH equivalent ratio greater than one) can also be used. A mixture containing diphenylmethane-4,4'-diisocyanate and polymethylene polyphenyl isocyanate is preferred because it provides better flow and reduces crystallinity with the preferred low molecular weight blocking agents methanol and ethanol described below.

Any suitable aliphatic, cycloaliphatic, aromatic alkyl monoalcohol and phenolic compound may be used as a capping agent in accordance with the present invention such as, for example, lower aliphatic alcohols containing from 1 to 4 carbon atoms such as methanol, ethanol and n-butyl alcohol; cycloaliphatic alcohols such as cyclohexanol; aromatic-alkyl alcohols such as phenyl carbinol and methylphenyl carbinol; phenolic compounds such as phenol itself, substituted phenols in which the substituents do not adversely affect coating operations. Examples include cresol and nitrophenol.

Additional capping agents include oximes such as methyl ethyl ketoxime, acetone oxime and cyclohexanone oxime and lactams such as epsilon-caprolactam. Preferred blocking agents are methanol and ethanol because these materials, although they volatilize from film on cure, do not contribute significantly to weight loss in the film.

Usually, sufficient polyisocyanate is present in the cationic polymer such that there is about 0.1 to about 1.2 capped isocyanate groups for each active hydrogen, i.e., hydroxyl, primary and secondary amino.

Usually the polyisocyanate is partially capped before reaction with the hydroxyl group-containing acid or hydroxyl group-containing mercaptan to partially defunctionalize the polyisocyanate and to minimize the danger of gelation.

The resinous reaction product prepared as described above is then further reacted with a cationic salt group former. By cationic salt group former is meant a material which is reactive with epoxy groups and which can be acidified after, during or before reaction with the epoxy groups to form cationic salt groups. Examples of such materials are amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

With regard to the amines, the preferred amines are monoamines, particularly hydroxyl-containing amines. Polyamines such as ethylenediamine and diethylenetriamine and triethylenetetraamine can be used but their use is not preferred because they are multifunctional and have a tendency to gel the reaction mixture. If polyamines are used, they should be used in a substantial stoichiometric excess with the epoxy functionality in the resinous reaction product (epoxy resin) so as to avoid the danger of gelation and the excess polyamine removed from the reaction mixture such as by vacuum stripping.

Tertiary and secondary amines are preferred to primary amines because the primary amines are polyfunctional with regard to reaction with epoxy groups and have a greater tendency to gel the reaction mixture. When using polyamines or primary amines, special precautions should be taken to minimize the danger of gelation, for example, excess amine can be used and the excess vacuum stripped at the completion of the reaction. Also, the epoxy resin can be added to the amine to insure that excess amine will be present. Examples of hydroxyl-containing amines are alkanolamines, dialkanolamines, trialkanolamines, alkylalkanolamines and arylalkylalkanolamines containing from 1 to 18, preferably 1 to 6 carbon atoms each in the alkanol, alkyl and aryl chains. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines which do not contain hydroxyl groups such as mono, di and trialkylamines and mixed alkyl-aryl amines and substituted amines in which the substituents are other than hydroxyl and in which the substituents do not detrimentally affect the epoxy-amine reaction product can also be used. Specific examples of these amines are ethylamine, methylethylamine, triethylamine, N-benzyldimethylamine, dicocoamine and N,N-dimethylcyclohexylamine.

Mixtures of the various amines described above can be used.

The reaction of the primary and/or secondary amine with the epoxy resin takes place upon mixing the amine with the epoxy resin. Reaction can be conducted neat or optionally in the presence of a suitable solvent. Reaction may be exothermic and cooling may be desired. However, heating to a moderate temperature, that is, within the range of 50° to 150° C., may be used to hasten the reaction.

The reaction product of the primary or secondary amine with the epoxy resin attains its cationic character by at least partial neutralization with acid. Examples of suitable acids include organic and inorganic acids such as formic acid, acetic acid, lactic acid, sulfamic acid, which is preferred, and phosphoric acid. The extent of neutralization will depend upon the particular product involved. It is only necessary that sufficient acid be used to disperse the product in water. Typically, the amount of acid used will be sufficient to provide at least 20 percent of all of the total theoretical neutralization. Excess acid beyond that required for 100 percent total theoretical neutralization can also be used.

In the reaction of the tertiary amine with the epoxy resin, the tertiary amine can be prereacted with the acid such as those mentioned above to form the amine salt and the salt reacted with the epoxy resin to form the quaternary ammonium salt group-containing resin. The reaction is conducted by mixing the amine salt and the epoxy resin together in the presence of water. Typically, the water is employed on the basis of about 1.75 to about 20 percent by weight based on total reaction mixture solids.

In forming the quaternary ammonium salt group-containing resin, the reaction temperature can be varied between the lowest temperature at which reaction reasonably proceeds, for example, room temperature, or in the usual case, slightly above room temperature to a maximum temperature of 100° C. (at atmospheric pressure). At greater than atmospheric pressure, higher reaction temperatures can be used. Preferably, the reaction temperature range is between about 60° to 100° C. Solvent for the reaction is usually not necessary, although solvents such as a sterically hindered ester, ether or sterically hindered ketone may be used if desired.

In addition to the primary, secondary and tertiary amines disclosed above, a portion of the amine which is reacted with the epoxy resin can be a ketimine of a polyamine. This is described in U.S. Pat. No. 4,104,147 at column 6, line 23 to column 7, line 23, the portions of which are hereby incorporated by reference. The ketimine groups will decompose upon dispersing the amine-epoxy resin reaction product in water resulting in free primary amine groups which would be reactive with the isocyanate curing agents.

Besides resins containing amine salts and quaternary ammonium salt groups, resins containing ternary sulfonium cationic groups can be used in the practice of the invention. Examples of these cationic resins and their method of preparation are described in U.S. Pat. Nos. 3,793,278 to DeBona and 3,959,106 to Bosso and Wismer.

The extent of cationic salt group formation of the resin should be selected that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards and electrodeposit on the cathode when an electrical potential is impressed between an anode and a cathode immersed in the aqueous dispersion.

In general, most of the cationic resins prepared by the process of the invention contain from about 0.1 to 3.0, preferably from about 0.1 to 0.7 milliequivalents of cationic group per gram of resin solids. Obviously, one must use the skill of the art to couple the molecular weight and the cationic group content to arrive at a satisfactory product. Accordingly, the resinous reaction products of the present invention preferably have number average molecular weights of about 5,000 to 15,000 and more preferably from about 6,000 to 10,000.

The active hydrogens associated with the cationic resins of the invention can be selected from any of the active hydrogens which are reacted with isocyanates over the temperature range of 93°-204° C., preferably 121°-177° C. Typically, the active hydrogens will be associated with hydroxyl, primary and secondary amino including mixed groups such as hydroxyl and primary amino. Preferably, the cationic resinous reaction products of the present invention will have an active hydrogen content of at least 2 to 10 and preferably from about 2.5 to 5 milliequivalents of active hydrogen per gram of resin solids.

The resins of the present invention are non-gelled and are used in the electrodeposition process in the form of aqueous dispersions. The term "dispersion" as used within the context of the present invention is believed to be a two-phase transparent, translucent or opaque aqueous resinous system in which the resin is the dispersed phase and water the continuous phase. Average particle size diameter of the resinous phase is usually less than 10 and preferably less than 5 microns. The concentration of the resinous phase in the aqueous medium depends upon the particular end use of the dispersion and in general is not critical. For example, the aqueous dispersion preferably contains at least about 0.05 and usually from about 0.05 to 50 percent by weight resin solids. By "non-gelled" is meant the cationic resins are substantially free of crosslinking and the resinous reaction products (prior to cationic salt group formation) have an intrinsic viscosity when dissolved in a suitable solvent. Intrinsic viscosity of the reaction product is an indication of its molecular weight. A gelled reaction product on the other hand since it has an essentially infinitely high molecular weight will have an intrinsic viscosity too high to measure.

Besides water, the aqueous medium may contain a coalescing solvent. Useful coalescing solvents include hydrocarbons, alcohols, esters, ethers and ketones. The preferred coalescing solvents include alcohols, polyols, ethers and ketones. Specific coalescing solvents include isopropanol, butanol, 2-ethylhexanol, isophorone, 4-methoxy-2-pentanone, ethylene and propylene glycol and the monoethyl, monobutyl and monohexyl ethers of ethylene glycol. The amount of the coalescing solvent is not unduly critical and is generally present in an amount of up to 40 percent by weight, preferably, about 0.05 to about 25 percent by weight based on total weight of the aqueous medium.

When formulated into a coating composition for use in cationic electrodeposition, the aqueous resinous dispersion described above is usually combined with pigments and various additives such as plasticizers, surfactants, wetting agents, defoamers and anti-cratering agents.

The pigment composition may be any of the conventional types comprising, for example, iron oxides, carbon black, coal dust, titanium dioxide, talc and barium sulfate. One of the advantages of using aqueous dispersions of the present invention in the process of cationic electrodeposition is the outstanding corrosion resistance they provide to steel substrates without the need for a lead-containing pigment. However, lead pigments may be used, if desired. The pigment content of the dispersion is usually expressed as the pigment to resin ratio. In the practice of the invention, the pigment to resin ratio is usually within the range of 0.1 to 1:1.

Examples of surfactants and wetting agents include alkyl imidazolines such as those available from Geigy Industrial Chemicals as GEIGY AMINE C, acetylenic alcohols available from Air Products and Chemicals as SURFYNOL. Examples of defoamers are FOAM KILL 63, hydrocarbon oil containing inert diatomaceous earth. Examples of anti-cratering agents are polyoxyalkylene-polyamine reaction products such as those described in U.S. Pat. No. 4,432,850. These optional ingredients when present constitute up to 30, usually 1 to 20 percent by weight of resin solids.

Curing catalysts such as tin catalysts are usually present in the composition. Examples are dibutyltin dilaurate and dibutyltin oxide. When used, they are typically used in amounts of 0.05 to 5 percent by weight based on weight of resin solids.

In the process of electrodeposition the aqueous dispersion is placed in contact with an electrically conductive anode and an electrically conductive cathode. Upon passage of the electric current between the anode and cathode while in contact with the aqueous dispersion, an adherent film of the coating composition will deposit in a substantially continuous manner on the cathode. The conditions under which electrodeposition is carried out are well known in the art. Electrodeposition is usually carried out at a constant voltage. The applied voltage may vary greatly and can be, for example, as low as 1 volt or as high as several thousand volts, although typically between 50 volts and 500 volts are employed. Current density is usually between about 1.0 ampere and 15 amperes per square foot (10.8-161.5 amperes per square meter) and tends to decrease quickly during electrodeposition indicating formation of a continuous self-insulating film. Any electroconductive substrate especially metal such as steel, zinc, aluminum, copper, magnesium or the like can be electrodeposited with the coating compositions of the present invention. However, the invention is particularly desirable for the coating of steel substrates because of the outstanding corrosion resistance it provides to the substrate. Although it is conventional to pretreat the steel substrate with a phosphate conversion coating followed by a chromic acid rinse before electrodeposition, the electrodeposition process of the present invention can be utilized with steel substrates which have not been given a chrome rinse and still provide for outstanding corrosion resistance.

After deposition, the coating is cured at elevated temperatures by any convenient method such as by baking in ovens. The curing temperature will typically be conducted over the range of from about 120° to 250° C., preferably from 120° to 190° C., for anywhere from 10 to 60 minutes. The thickness of the resultant film will typically vary from about 10 to 50 microns.

The aqueous resinous dispersions of the present invention besides being applied by electrodeposition could also be applied by conventional coating applications such as flow, dip, spray and roll coating applications.

Illustrating the invention are the following examples which, however, are not to be construed as limiting the invention to their details. All parts and percentages in the examples as well as throughout the specification are by weight unless otherwise indicated.

EXAMPLES

Vehicle Resins

EXAMPLE A

The following Example shows the preparation of an acid-functional compound which also contains blocked isocyanate groups and mixing the resultant acid-functional compound with a bisphenol A-ethylene oxide adduct for subsequent reaction with a polyepoxide in Example 1.

Into a 12-liter flask which was equipped with a stirrer, a condenser, a nitrogen inlet, a thermometer and an addition funnel was placed 2820.0 grams (21.54 equivalents) of a mixture of diphenyl-4,4'-diisocyanate and polyphenyl polyisocyanate available from Mobay Chemical Co. as MONDUR MRS-4, 640.1 grams of methyl isobutyl ketone and 0.52 gram of dibutyltin dilaurate. A nitrogen blanket was begun. Into the addition funnel was charged a total of 508.0 grams of a blend consisting of 56.8 to 58.8 percent methanol with 40.7 to 42.7 percent ethanol and 0.35 to 0.65 percent methyl isobutyl ketone. While stirring the polyisocyanate solution, the alcohol blend was added dropwise, beginning at ambient temperature, over a period of about 1.5 hours, while keeping the temperature primarily in the 60°-65° C. range. After the addition was complete, a temperature of 65° C. was maintained for 1 hour, at which time the NCO equivalent was determined to be 512. At that point, 3.41 grams of dibutyltin dilaurate and 505.4 grams (7.54 equivalents of hydroxyl) of dimethylolpropionic acid were added. The reaction mixture was heated to 95° C. and held there until only a very weak isocyanate absorbance was detected by infrared spectroscopy. At that point, 1375.6 grams (5.77 equivalents) of a bisphenol A-ethylene oxide polyol (mole ratio 1:7) and a total of 1093.2 grams of methyl isobutyl ketone were added and mixed to homogeneity. The product had a 75.3 percent solids content (1 hour at 110° C.), an acid value of 30.76 (theoretical 30.47) and 0.11 percent water.

EXAMPLE B

The following Example shows the preparation of a mercapto-functional compound which also contains blocked isocyanate groups and mixing the resultant mercapto-functional compound with a bisphenol A-ethylene oxide adduct for subsequent reaction with a polyepoxide in Example 3.

A 5-liter flask equipped with a stirrer, a condenser, a nitrogen inlet, a thermometer and an addition funnel was charged with 1229.5 grams (9.55 equivalents) of MONDUR MRS-4 (a product of Mobay Corporation), 279.1 grams of methyl isobutyl ketone (MIBK) and 0.23 grams of dibutyltin dilaurate. A nitrogen blanket was established. The addition funnel was charged with 230.0 grams of a blend consisting of 56.8 to 58.8 percent by weight methanol with 40.7 to 42.7 percent ethanol and 0.35 to 0.65 percent MIBK. The alcohol blend was added dropwise to the stirred polyisocyanate solution beginning at ambient temperature up to a temperature of 55°–65° C. over a period of about 2 hours. After completion of the addition, the reaction mixture was held at 60° C. for one hour. At that point, the NCO equivalent was determined to be 546. To this was added 1.5 grams of dibutyltin dilaurate and 171.2 grams (3.17 equivalents of hydroxyl) of 3-mercapto-1,2-propanediol. The temperature was raised to 95° C. and held there until only a very weak isocyanate absorbance was detected by infrared spectroscopy. At that point, 424.3 grams of MIBK was added and the mixture stirred to homogeneity. The product had a 71.6 percent solids content with a mercaptan equivalent of 0.634 (theoretical 0.695).

EXAMPLE C

The following Example shows the preparation of a fully blocked isocyanate-containing compound with no acid or mercapto functionality (neopentyl glycol-MONDUR MRS-4-adduct blocked with methanol-ethanol) for the purpose of comparison with those of Examples A and B. The crosslinker was combined with a bisphenol A-ethylene oxide adduct for subsequent reaction with a polyepoxide in Comparative Example 5.

Into a 12-liter flask which was equipped with a stirrer, a condenser, a nitrogen inlet, a thermometer and an addition funnel was placed 2338.2 grams (17.99 equivalents) of MONDUR MRS-4, 530.8 grams of MIBK and 0.4 grams of dibutyltin dilaurate. A nitrogen blanket was established. Into the addition funnel was charged 411.6 grams of a blend consisting of 56.8 to 58.8 percent methanol with 40.7 to 42.7 percent ethanol and 0.35 to 0.65 percent MIBK. While stirring the polyisocyanate solution, the alcohol blend was added dropwise, beginning at ambient temperature, up to 60°–65° C. over a period of about 2.5 hours. After the addition was complete, a temperature of about 65° C. was maintained for one hour, at which time the NCO equivalent was determined to be 524. To this was added 163.6 grams (3.15 equivalents) of neopentyl glycol followed by heating to 74° C. About 30 minutes after the first addition, the second 163.6 grams of the glycol was added and the reaction mixture was heated to 95° C. and held there until the 4.4 micron peak in the infrared spectrum became negligible (this required the addition of 10.0 grams of the glycol). A solution of 114.0 grams of 1:7 bisphenol A:ethylene oxide diol in 214.0 grams of MIBK was heated to reflux under a water trap and nitrogen to ensure its dryness and then added to this blocked isocyanate and the whole was blended to yield a homogeneous resin solution at 87.5 percent solids.

EXAMPLE D

The following Example shows the preparation of a partially blocked isocyanate-containing compound (MONDUR MRS methanol-ethanol NCO:OH equivalent ratio of 1.2:1) for the purpose of comparison with those of Examples A and B. The crosslinker was combined with a bisphenol A-ethylene oxide adduct for subsequent reaction with a polyepoxide in Comparative Example 6.

A 5-liter flask equipped with a stirrer, a condenser, a nitrogen inlet, a thermometer and an addition funnel was charged with 1790.0 grams (13.90 equivalents) of MONDUR MRS-4, 406.3 grams of methyl isobutyl ketone and 0.33 gram of dibutyltin dilaurate. A nitrogen blanket was begun. A total of 401.3 grams of a blend consisting of 56.8 to 58.8 percent methanol and 40.7 to 42.7 percent ethanol and 0.35 to 0.65 percent methyl isobutyl ketone was added dropwise to the stirred polyisocyanate solution over a period of about 2.25 hours, beginning at ambient temperature and rising to predominantly 60°–65° C. After the addition was completed, the reaction mixture was held at 65° C. for one hour, whereupon the NCO equivalent was determined to be 1021 at 77.6 percent solids.

EXAMPLE 1

This Example shows the preparation of a cationic, water dispersible resin in accordance with the present invention using the acid-functional compound containing blocked isocyanate groups of Example A.

A 12-liter flask equipped with a stirrer, a condenser, a nitrogen inlet, and a thermometer was charged with 4334.4 grams (862.3 grams polyol, 2397.2 grams acid-functional material, 2.4 equivalents acid) of the mixture of Example A, 2537.5 grams (13.56 equivalents) of bisphenol A diglycidyl ether, and 488.9 grams (8.89 equivalents) of resorcinol. Under a nitrogen blanket, these ingredients were stirred while being heated to 90° C. At 90° C., 4.3 grams of benzyl dimethylamine were added and the temperature was raised to 105° C. The reaction mixture was held at 105° C. for one hour. An additional 5.6 grams of benzyl dimethylamine were then added and the reaction was held at 105° C. until an epoxy equivalent (solids) of 1639 gram/equivalent was reached, evidencing a Gardner-Holdt viscosity of W- at 60 percent solids in 1-methoxy-2-propanol. At that point was added 129.8 grams (1.02 equivalents of amine) of the diethylene triamine diketimine of methyl isobutyl ketone at about 70 percent in excess ketone, 87.7 grams (1.35 equivalents of amine) of N-(2-hydroxyethyl)-piperazine, 170.5 grams (0.45 equivalent) of dicocoamine, 131.2 grams (1.75 equivalents) of N-methylethanolamine and 31.0 grams (0.21 equivalent) of 2-tert-butyl-phenol. The temperature was adjusted to 113° C. and held for one hour. At that point, solvent was removed under reduced pressure to raise the theoretical solids content to 89 percent.

Of this resin, 7200 grams (6408 grams solids) was added to a mixture of 2410.6 grams of deionized water, 147.0 grams (1.52 equivalents) of sulfamic acid and 100.9 grams of a surfactant blend while stirring. The surfactant blend was prepared by blending 120 grams of alkyl imidazoline commercially available from Geigy Industrial Chemicals as GEIGY AMINE C, 120 parts by weight of an acetylenic alcohol commercially available from Air Products and Chemicals, Inc. as SUR-FYNOL 104, 120 parts by weight of 2-butoxyethanol and 211 parts by weight of deionized water and 19 parts by weight of glacial acetic acid.

After one hour stirring, deionized water totalling 8030.9 grams was added gradually with continued stirring.

This dispersion was diluted with a total of 1834.0 grams of deionized water, warmed to 60°-66° C. and exposed to reduced pressure to remove volatile organic solvents to yield a dispersion of 37.6 percent solids with a particle size of 2220 Angstroms.

EXAMPLE 2

The following Example shows the formulation of a lead-free cationic electrodeposition paint using the aqueous cationic resinous dispersion of Example 1. Bimetallic (untreated steel-untreated hot dipped galvanized steel) coach joints and untreated steel panels were electrocoated in the paint, cured and evaluated generally in accordance with General Motors Scab Corrosion testing method TM54-26.

For the purpose of comparison, identical substrates were electrocoated and cured with UNI-PRIME cationic electrodeposition paint available from PPG Industries, Inc. and compared with the substrate coated in accordance with the invention. The UNI-PRIME paint, specifically ED-3150, contained lead.

To 1182.4 grams of the dispersion of Example 1 was added 86.1 grams of a 34.4 percent solids stripped dispersion of an adduct prepared from JEFFAMINE D2000 and EPON 828 and containing 15 percent crosslinker prepared generally in accordance with Example H of U.S. Pat. No. 4,419,467 with the exception that the neutralizing acid was sulfamic instead of acetic (35 percent total theoretical neutralization).

A paint was formed by adding to the dispersion 22.6 grams of the formal of 2-(2-n-butoxyethoxy) ethanol, 14.6 grams of 2-hexoxyethanol, 279.4 grams of a pigment paste which contributed 11.6 grams of dibutyltin oxide, 3.4 grams of carbon black and 124.4 grams of titanium dioxide (but no lead). The paint was thinned with 1416.2 grams of deionized water to yield a paint having a pH of 5.60 and 1432 micromhos conductivity. The paint was ultrafiltered 20 percent of the total paint weight and replenished with deionized water, reducing the conductivity to 1219 and the pH to 5.43.

Untreated (no phosphate pretreatment; no chrome rinse) steel coach joints and panels were electrocoated at 215 volts for 2 minutes with the paint at 85° F. After rinsing with deionized water and air drying, the coach joints and panels were baked for 30 minutes at 340° F. and subjected to GM Scab Corrosion cyclic testing and compared to similar substrates coated with UNI-PRIME electrocoat paint (ED 3150), which contains lead.

After twenty (20) cycles, the test paint rated a 6 over bimetallic coach joints on a scale of 1 to 10 with 10 being best, while ED 3150 rated 7. Over untreated steel flat panels, the test paint rated 2 versus 4 for ED 3150 after 20 cycles. Performances over phosphated steel substrates given a chrome rinse were equal after 20 cycles.

EXAMPLE 3

This Example shows the preparation of a cationic, water-dispersible resin in accordance with the present invention using the mercapto-functional compound containing blocked isocyanate groups of Example B.

A 5-liter flask equipped with a stirrer, a condenser, a nitrogen inlet and a thermometer was charged with 936.4 grams (670.5 grams solids, 0.59 equivalents mercaptan) of the mercaptan-functional crosslinker of Example B, 273.0 grams (244.9 grams solids, 1.00 equivalents) of azeotropically-dried bisphenol A:ethylene oxide diol (1:7 mole ratio) in methyl isobutyl ketone, 720.6 grams (3.85 equivalents) of bisphenol A diglycidyl ether and 138.9 grams (2.53 equivalents) of resorcinol. Under a nitrogen blanket, the mixture was heated to 90° C. At 90° C., 1.8 grams of benzyl dimethylamine was added and the mixture was heated to 105° C., where it was held until an epoxy equivalent of 1636 was reached, evidencing a Gardner-Holdt viscosity of S at 60 percent solids in 1-methoxy-2-propanol. At that point, 36.5 grams (0.1 mole, 0.29 equivalents) of the MIBK diketimine of diethylene triamine in excess MIBK, 25.1 grams (0.19 mole) of N-(2-hydroxyethyl)-piperazine, 48.8 grams of dicocoamine, 37.5 grams (0.50 equivalents) of N-methylethanolamine and 8.8 grams (0.06 equivalents) of o-t-butylphenol were added. The temperature was adjusted to 115° C. and held there for one hour. At that point, solvent was removed under reduced pressure to raise the theoretical solids content to 89 percent.

Of this resin, 1775 grams was poured into a mixture of 594.5 grams of deionized water containing 36.4 grams (0.38 equivalents) of sulfamic acid and 24.9 grams of the surfactant blend used in Example 1. After one hour, a total of 1980.5 grams of deionized water was added gradually with stirring.

This dispersion was diluted with a total of 744.0 grams of deionized water, warmed to 60°-65° C. and exposed to reduced pressure to remove volatile organic solvents. The stripped dispersion had a solids content of 38.7 percent and a particle size of 1960 Angstroms.

EXAMPLE 4

The following Example shows the formulation of a lead-free cationic electrodeposition paint using the aqueous cationic resinous dispersion of Example 3. Zinc-phosphate-chromic acid rinse pretreated steel panels and untreated steel panels were electrocoated in the paint, cured and evaluated generally in accordance with General Motors Scab Corrosion testing method TM54-26.

For the purpose of comparison, identical substrates were electrocoated and cured with UNI-PRIME cationic electrodeposition paint available from PPG Industries, Inc. and compared with the substrates coated in accordance with the invention. The UNI-PRIME paint, specifically ED 3150, contained lead.

To 1150.3 grams of the dispersion of Example 3 was added 80.6 grams of a 36.7 percent solids dispersion of the JEFFAMINE D-2000 flexibilizing adduct described in Example 2, 22.6 grams of the formal of 2-(2-n-butoxyethoxy) ethanol, 13.3 grams of 2-hexoxyethanol, 286.7 grams of a pigment paste which contributed 11.6 grams of dibutyltin oxide, 3.4 grams of carbon black and 124.4 grams of titanium dioxide (but no lead) and a total of 1446.5 grams of deionized water. Initially this paint had a pH of 5.56 and a conductivity of 1269 micromhos. A 20 percent ultrafiltration and replenishment with deionized water changed this to 5.65 and 1150, respectively.

Test panels were electrocoated at 215 volts for 2 minutes at an 85° F. bath temperature. After rinsing with deionized water and air-drying, the panels were baked for 30 minutes at 340° F. and then subjected to GM Scab Corrosion cyclic testing versus PPG ED 3150 electrodeposition paint, which contains lead.

After 20 cycles over zinc phosphate pretreated-chromic acid rinsed steel, this test paint was rated 6 versus 6 for ED 3150. Over untreated steel, the ratings were 1 versus 3, respectively.

COMPARATIVE EXAMPLE 5

This Example shows the preparation of a cationic water-dispersible resin similar to Examples 1 and 3 but using the blocked isocyanate crosslinker of Example C. The dispersion was then used to formulate a lead-free cationic electrodeposition paint which was electrodeposited over zinc phosphate pretreated, chromic acid rinsed steel panels and untreated non-phosphated electrogalvanized steel panels and untreated steel panels. The cured coated panels were then evaluated for scab corrosion resistance.

The cationic water dispersible resin was prepared as follows: A 3-liter flask equipped with a stirrer, a condenser, a nitrogen inlet and a thermometer was charged with 1021.3 grams of the crosslinker solution of Example C, 798.8 grams (4.27 equivalents) of bisphenol A diglycidyl ether, 153.9 grams (2.80 equivalents) of resorcinol and 186.6 grams of MIBK. Under a nitrogen blanket and with stirring, this mixture was heated to 90° C. At 90° C., 1.9 grams of benzyl dimethylamine was added and the temperature was raised to 105° C. After one hour at 105° C., an additional 2.5 grams of benzyl dimethylamine was added and 105° C. was held until an epoxy equivalent of 1444 was reached, evidencing a viscosity of Q+ at 60 percent solids in 1-methoxy-2-propanol. At that point, 40.3 grams (0.11 equivalents) of diethylene triamine diketimine solution, 27.3 grams (0.21 equivalents) of N-(2-hydroxyethyl)-piperazine, 52.6 grams (0.14 equivalents) of dicocoamine, 40.8 grams (0.54 equivalents) of N-methylethanolamine and 9.7 grams (0.06 equivalents) of o-t-butylphenol were added. The temperature was adjusted to 115° C. and held there for one hour. The viscosity of the resin was determined to be V-W at 60 percent solids. Of this resin, 2000 grams was then dispersed in a solution of 42.1 grams (0.43 equivalents) of sulfamic acid and 28.4 grams of the surfactant mixture of Example 1 in 704.9 grams of deionized water. After one hour a total of 3376.1 grams of deionized water was gradually added accompanied by thorough mixing. The resulting dispersion was warmed to 61°-63° C. and a vacuum was applied to remove water and volatile organic solvents, yeilding a stripped product at 37.3 percent solids.

A lead-free cationic electrodeposition paint was prepared using the aqueous cationic resinous dispersion prepared as described above. Zinc phosphate-chromic acid rinse pretreated steel panels, untreated non-phosphated electrogalvanized steel panels and untreated steel panels were electrocoated in the paint, cured and evaluated generally in accordance with General Motors Scab Corrosion testing method TM54-26. For the purposes of comparison, identical substrates were electrocoated and cured with UNI-PRIME cationic electrodeposition paint (ED 3150) available from PPG Industries, Inc. and with the cationic electrodeposition paint containing an acid functional blocked isocyanate crosslinker as described in Example 1.

To 1166.3 grams of the dispersion was added 78.8 grams of a 37.6 percent solids dispersion of a JEFFAMINE D-2000 flexibilizing adduct described in Example 2, 29.6 grams of PARAPLEX WP-1 (product of Rohm and Haas), a total of 23.9 grams of 2-hexoxyethanol and 279.4 grams of a pigment paste which contributed 11.6 grams of dibutyltin oxide, 3.4 grams of carbon black and 124.4 grams of titanium dioxide (but no lead). Finally, 1453.0 grams of deionized water was added to yield a paint with pH of 5.89 and conductivity of 1434 micromhos. A 20 percent ultrafiltration and replenishment with deionized water changed this to 5.71 and 1171, respectively.

Test panels were electrocoated at 300 volts for 2 minutes at a bath temperature of 95° C. to give about 1.16 mil film build. After rinsing with deionized water and air drying, the panels were baked for 30 minutes at 340° F. and then subjected to GM Scab Corrosion cyclic testing versus PPG ED 3150 electrodeposition paint containing lead as well as a paint made with the cationic water-dispersible resin of Example 1 and formulated in a manner similar to this example and electrodeposited at 240 volts for 2 minutes at 85° F. to give about 1.18 mil film build.

The relative ratings after 20 cycles of testing were as follows:

| Paint Example | Test Results Over Steel Substrates | | |
|---|---|---|---|
| | Zinc Phosphate Pretreated-Chromic Acid Rinse | Untreated Non-Phosphated Electro-galvanized | Untreated |
| Comparative Example 5 | 8 | 5 | 1 |
| UNI-PRIME | 7 | 5 | 5 |
| Paint Containing Acid Functional Blocked Isocyanate Crosslinker | 7 | 5 | 4 |

The data summarized immediately above shows that the paint containing acid functional blocked isocyanate crosslinker provides better corrosion resistance over untreated steel substrates compared to a similar paint containing a blocked isocyanate crosslinker which does not have acid functionality (Comparative Example 5). The paint containing the acid functional blocked isocyanate crosslinker provides almost as good corrosion resistance over untreated steel substrates as does the lead containing paint (UNI-PRIME).

COMPARATIVE EXAMPLE 6

This Example shows the preparation of a cationic water-dispersible resin similar to Examples 1 and 3 but using the blocked isocyanate crosslinker of Example D. In this example, the partially blocked isocyanate crosslinker is incorporated into the resin backbone by reaction of the isocyanate groups with hydroxyl groups. The dispersion was then used to formulate a lead-free cationic electrodeposition paint which was electrodeposited over untreated steel panels and untreated non-phosphated electrogalvanized steel panels. The cured, coated panels were then evaluated for scab corrosion resistance.

The cationic water-dispersible resin was prepared as follows: A 5-liter flask equipped with a stirrer, a condenser, a nitrogen inlet and a thermometer was charged with 748.2 grams (4.00 equivalents) of bisphenol A diglycidyl ether, 252.1 grams (1.04 equivalents) of a 1:7 bisphenol A-ethylene oxide diol, 144.4 grams (2.63 equivalents) of resorcinol and 49.9 grams of methyl isobutyl ketone. While stirring under a nitrogen blanket, the mixture was heated to 90° C. and held there until all of the resorcinol dissolved. At that point, 849.6 grams (0.83 equivalents) of the partially blocked polyisocyanate of Example D and 49.9 grams of methyl isobutyl ketone were added. The temperature was adjusted to 90° C. and held there until the 4.4 micron peak in the infrared spectrum was negligible. Then 1.6 grams of benzyl dimethylamine was added and the temperature was raised to 105° C. and held there for one hour, whereupon an additional 2.3 grams of benzyl dimethylamine was added. The temperature was maintained at 105° C. until an epoxy equivalent of 1480 on solids was reached (evidencing a V+ Gardner-Holdt viscosity at 60 percent solids in 1-methoxy-2-propanol), that occurrence coinciding with the prompt, sequential addition of 36.3 grams (0.29 equivalents) of diethylene triamine methyl isobutyl ketone diketimine at about 72 percent in methyl isobutyl ketone, 25.3 grams (0.19 equivalents) of N-(2-hydroxyethyl)-piperazine, 48.7 grams (0.13 equivalents) of dicocoamine, 37.8 grams (0.50 equivalents) of N-methylethanolamine and 9.0 grams (0.06 equivalents) of o-t-butylphenol. The temperature was adjusted to 115° C., and held there for one hour. Under reduced pressure, 85 grams of volatiles was removed and 1775 grams of this resin was dispersed by pouring into a stirred solution of 593.2 grams of deionized water, 37.7 grams (0.39 equivalents) of sulfamic acid and 24.9 grams of the surfactant mixture used in the above examples. After stirring the heavy dispersion for one hour, a total of 3541.4 grams of deionized water was gradually added in small portions with good blending and then the whole was heated to 60°-62° C., whereupon a vacuum was applied and sufficient volatiles were removed to ultimately yield a 32.2 percent solids dispersion.

To 1740.0 grams of this dispersion was added 93.8 grams of a 40.7 percent solids dispersion of a JEFFAMINE D-2000 flexibilizing adduct, 29.1 grams of the formal of 2-(2-n-butoxyethoxy)ethanol, 82.5 grams of a 15.4 percent solids dispersion of a microgel flow control additive, 16.8 grams of 2-hexoxyethanol, and 306.8 grams of a pigment paste which contributed 4.0 grams of carbon black, 144.3 grams of titanium dioxide, 13.5 grams of dibutyltin oxide (but no lead) to this mixture. Finally, 1531.0 grams of deionized water was added to yield a paint which, after ultrafiltrative removal of 20 percent of the total paint weight and replenishment with deionized water, had a conductivity of 995 micromhos and a pH of 5.56.

Panels were electrocoated at 275 volts for 2 minutes at a bath temperature of 87° F. After rinsing with deionized water and air drying, the panels were baked at 340° F. for 30 minutes and subjected to General Motors Scab Corrosion testing method TM54-26. For the purpose of comparison, identical substrates were electrocoated and cured with UNI-PRIME cationic electrodeposition paint (ED 3150) available from PPG Industries, Inc.

Over GM bare steel coach joints, lead-free paint rated 4 while ED 3150 rated 9. Over untreated steel panels, the lead-free paint rated 1 versus 4 for ED 3150, while over untreated non-phosphated electrogalvanized steel panels, the lead-free paint rated 1 versus 4 for ED 3150, all after 20 cycles.

We claim:

1. An electrodepositable composition, comprising a non-gelled cationic water-dispersible resin electrodepositable on a cathode which is derived from an epoxy resin and which contains in the resin molecule cationic salt groups, active hydrogen groups and blocked isocyanate groups, said blocked isocyanate groups being incorporated into the resin molecule by reacting said epoxy resin prior to curing said epoxy resin with an acid group-containing compound, said compound also containing said blocked isocyanate groups, wherein said acid group-containing compound is prepared by reacting a partially capped polyisocyanate and a hydroxyl group-containing acid and wherein said composition is free of lead.

2. The cationic resin of claim 1 in which the epoxy resin is a polyglycidyl ether of a polyhydric material.

3. The cationic resin of claim 2 in which the polyglycidyl ether of the polyhydric material is chain extended with a polyhydric phenol.

4. The cationic resin of claim 3 in which the polyhydric phenol is resorcinol.

5. The cationic resin of claim 1 in which the cationic salt groups are amine salt groups.

6. The cationic resin of claim 1 in which the amine salt groups are amine salt groups of sulfamic acid.

7. The cationic resin of claim 1 in which the active hydrogen groups are selected from the class consisting of primary amine groups, hydroxyl groups and mixtures thereof.

8. The cationic resin of claim 1 wherein said acid group-containing compound is a carboxylic acid group-containing compound.

9. The cationic resin of claim 8 wherein said carboxylic acid group-containing compound is formed from reacting a polyisocyanate, a hydroxyl group-containing acid and a blocking agent for said polyisocyanate.

10. The cationic resin of claim 8 wherein said hydroxyl group-containing acid is dimethylolpropionic acid.

11. The cationic resin of claim 1 in which the polyisocyanate is selected from the class consisting of diphenylmethane-4,4'-diisocyanate and mixtures of diphenylmethane-4,4'-diisocyanate and polymethylene polyphenylisocyanate.

12. The cationic resin of claim 1 in which the isocyanate groups are blocked with a lower aliphatic alcohol.

13. The cationic resin of claim 12 in which the lower aliphatic alcohol is selected from the class consisting of methanol, ethanol or mixtures thereof.

14. An aqueous dispersion containing the cationic resin of claim 1.

15. The aqueous dispersion of claim 14 which is free of lead.

16. A method of electrodepositing an electroconductive substrate which serves as a cathode in an electrical circuit comprising said cathode and an anode immersed in an aqueous electrocoating composition containing a cationic water-dispersible resin, said method comprising passing electric current between the anode and the cathode to cause the electrocoating composition to deposit on the cathode as a substantially continuous film, heating the electrodeposited film at elevated temperature to form a cured film, characterized in that the cationic water-dispersible resin is non-gelled, is electrodepositable on a cathode, is derived from an epoxy resin and contains in the resin molecule cationic salt groups, active hydrogen groups and blocked isocyanate groups, said blocked isocyanate groups being incorporated into the resin molecule by reacting said epoxy resin prior to curing said epoxy resin with a compound selected from the class consisting of mercapto compounds and acid group-containing compounds, wherein said acid group-containing compounds are prepared by reacting a partially capped polyisocyanate and a hydroxyl group-containing acid, said compounds also containing said blocked isocyanate groups and the aqueous electrocoating composition is free of lead.

17. The method of claim 16 in which the cathode is steel which has not been given a chrome rinse pretreatment step.

18. A process for preparing a non-gelled cationic resin comprising:
1) mixing the following ingredients together simultaneously:
 i) a polyepoxide,
 ii) a polyhydroxyl group-containing material selected from alcoholic hydroxyl group-containing materials and phenolic hydroxyl group-containing materials, and
 iii) an acid group or mercapto group-containing material which also contains a blocked isocyanate group;
2) heating the mixture to form a resinous reaction product wherein the mercapto groups or acid groups of said compound are reacted with epoxy groups of said epoxy resin;
3) reacting said resinous reaction product with a cationic salt group former to form said cationic resin.

19. The process of claim 18 in which said polyepoxide is a polyglycidyl ether of a polyphenol.

20. The process of claim 18 in which said resinous reaction product is epoxy group-containing resin.

21. The process of claim 20 in which the resinous reaction product has an epoxy equivalent based on solids of 1200 to 2500.

22. The process of claim 18 in which the polyhydroxyl group-containing material is selected from the class consisting of polyether polyols, resorcinol and mixtures thereof.

23. The process of claim 22 in which the polyether polyol is formed from reacting
 (A) a cyclic polyol with
 (B) ethylene oxide or a mixture of ethylene oxide and an alkylene oxide having 3 to 8 carbon atoms in the alkylene chain;
the equivalent ratio of (B) to (A) being within the range of 3 to 20:1.

24. The process of claim 18 in which the acid group-containing compound (iii) is formed from reacting a polyisocyanate, a hydroxyl group-containing acid and a blocking agent for said polyisocyanate.

25. The process of claim 24 in which the hydroxyl group-containing acid is dimethylolpropionic acid.

26. The process of claim 24 in which the polyisocyanate is selected from the class consisting of diphenylmethane-4,4'-diisocyanate and mixtures of diphenylmethane-4,4'-diisocyanate and polymethylene polyphenylisocyanate.

27. The process of claim 24 in which the blocking agent is a lower aliphatic alcohol.

28. The process of claim 27 in which the lower aliphatic alcohol is selected from the class consisting of methanol, ethanol and mixtures thereof.

29. The process of claim 18 in which the cationic salt group formers are mixtures of acids and members of the class consisting of primary amines, secondary amines, tertiary amines and sulfide groups including mixtures thereof.

30. A non-gelled cationic water-dispersible resin electrodepositable on a cathode which is derived from an epoxy resin and which contains in the resin molecule cationic salt groups, active hydrogen groups and blocked isocyanate groups, said blocked isocyanate groups being incorporated into the resin molecule by reacting said epoxy resin prior to curing said epoxy resin with a mercapto compound, said compound also containing said blocked isocyanate groups.

* * * * *